United States Patent
Liu

(10) Patent No.: US 8,237,420 B2
(45) Date of Patent: Aug. 7, 2012

(54) INRUSH CURRENT SUPPRESSING CIRCUIT AND ELECTRONIC DEVICE USING THE SAME

(75) Inventor: An Liu, Shanghai (CN)

(73) Assignees: Ambit Microsystems (Shanghai) Ltd., Shanghai (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 269 days.

(21) Appl. No.: 12/770,739

(22) Filed: Apr. 30, 2010

(65) Prior Publication Data

US 2011/0214001 A1    Sep. 1, 2011

(30) Foreign Application Priority Data

Feb. 26, 2010 (CN) .......................... 2010 2 0120301

(51) Int. Cl.
*G05F 1/573* (2006.01)
*H02H 9/08* (2006.01)
*H02M 1/00* (2007.01)

(52) U.S. Cl. .......... 323/277; 361/93.9; 323/908; 363/49

(58) Field of Classification Search .................. 363/49; 323/276–279, 901, 908; 361/18, 93.1, 93.9
See application file for complete search history.

(56) References Cited

U.S. PATENT DOCUMENTS

| | | | |
|---|---|---|---|
| 5,420,780 A | | 5/1995 | Bernstein et al. |
| 5,574,632 A | * | 11/1996 | Pansier ........................... 363/49 |
| 6,665,200 B2 | * | 12/2003 | Goto et al. ...................... 363/55 |
| 6,735,098 B2 | * | 5/2004 | Hussein et al. ............. 363/56.03 |
| 7,012,793 B2 | * | 3/2006 | Cheevanantachai et al. ... 361/82 |
| 7,586,727 B2 | * | 9/2009 | Yamashita ................... 361/93.9 |

* cited by examiner

*Primary Examiner* — Jessica Han
(74) *Attorney, Agent, or Firm* — Altis Law Group, Inc.

(57) ABSTRACT

An inrush current suppressing circuit connected between a power supply and a working circuit of an electronic device includes a first power supply circuit and a second power supply circuit both connected between the power supply and the working circuit. The first power supply circuit suppresses inrush current and forwards power from the power supply to the working circuit when the electronic device is powered on. The second power supply circuit forwards power from the power supply to the working circuit when the power supply reaches a predetermined voltage.

12 Claims, 2 Drawing Sheets

INRUSH CURRENT SUPPRESSING CIRCUIT AND ELECTRONIC DEVICE USING THE SAME

BACKGROUND

1. Technical Field

The disclosure relates to electronic devices, and particularly to an electronic device including an inrush current suppressing circuit.

2. Description of Related Art

When an electronic device is powered on, a high inrush current often occurs. Without protective circuits, inrush current would damage the electronic device. Commonly, thermal resistors are used to suppress inrush current. However, thermal resistors are easily influenced by temperature, and function poorly if ambient temperatures become too high.

DETAILED DESCRIPTION

Figure 1:
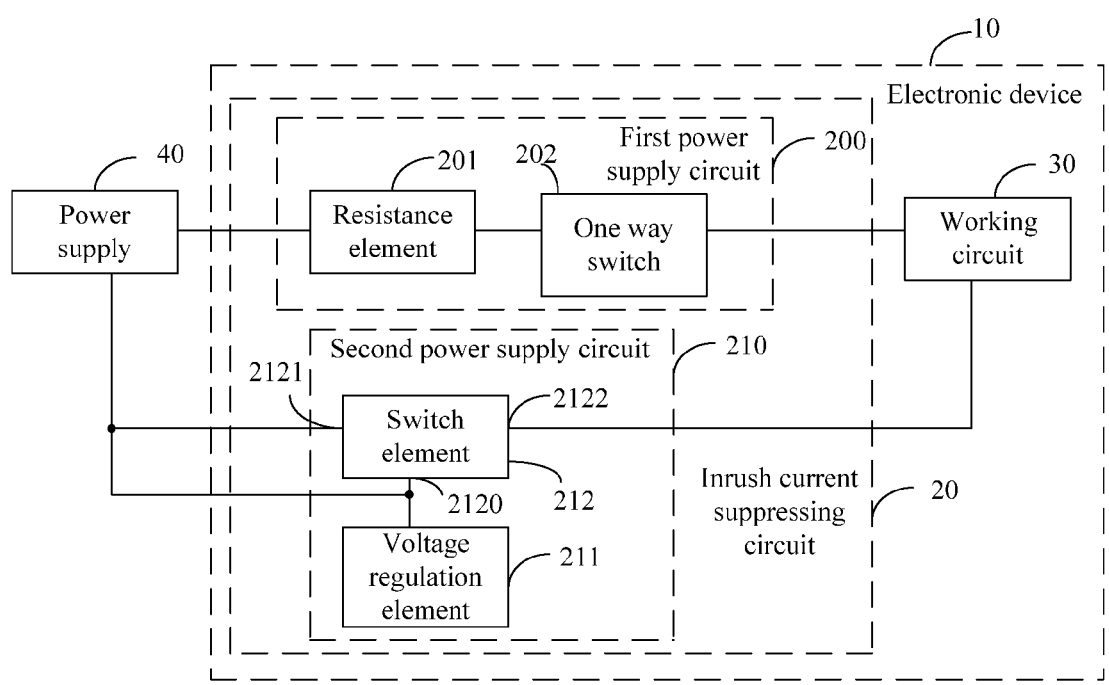
FIG. 1 is a schematic diagram of an embodiment of an electronic device as disclosed.

FIG. 1 is a schematic diagram of an embodiment of an electronic device 10 as disclosed. The electronic device 10 may be a communication device, such as, a router, a modem, or a set top box, for example. In one embodiment, the electronic device 10 is powered by a power supply 40, and includes an inrush current suppressing circuit 20 and a working circuit 30. In one embodiment, the power supply 40 may be an external power supply. In alternative embodiments, the power supply 40 may be an internal power supply. The working circuit 30 implements main functions of the electronic device 10. For example, the working circuit 30 may be a motherboard or a processor.

The inrush current suppressing circuit 20 is connected between the power supply 40 and the working circuit 30, and forwards power from the power supply 40 to the working circuit 30 and suppresses inrush current generated when the electronic device 10 is powered on. In one embodiment, the inrush current suppressing circuit 20 includes a first power supply circuit 200 and a second power supply circuit 210.

Figure 2:
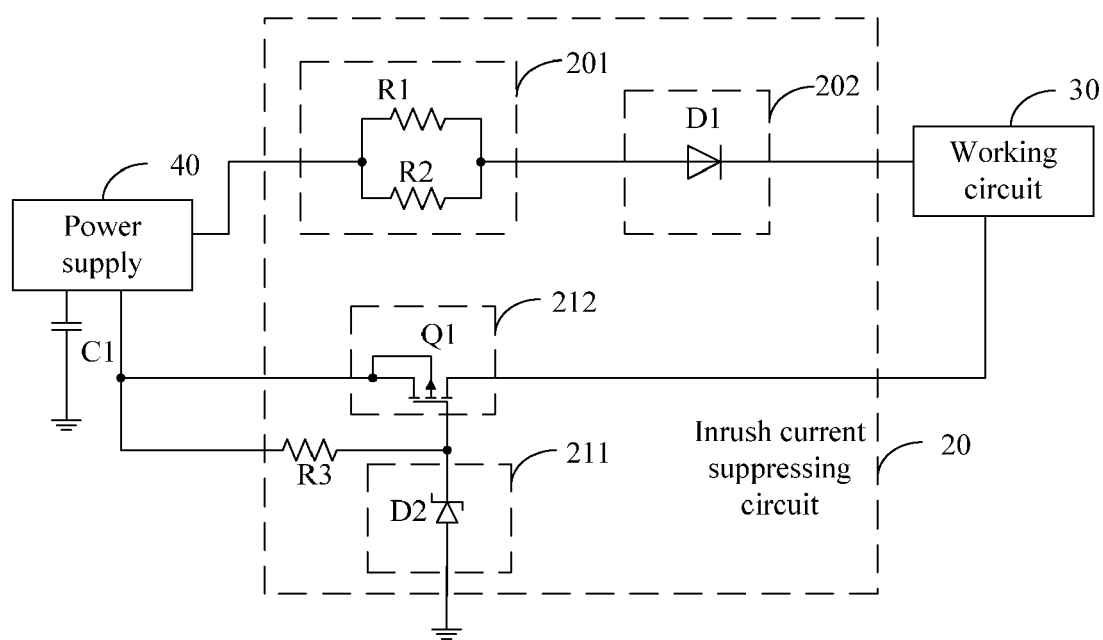
FIG. 2 is a circuit diagram of an embodiment of an inrush current suppressing circuit as disclosed.

The first power supply circuit 200 is connected between the power supply 40 and the working circuit 30, and forwards power from the power supply 40 to the working circuit 30 when the electronic device 10 is powered on. In one embodiment, the first power supply circuit 200 includes a resistance element 201 and a one way switch 202. The resistance element 201 suppresses the inrush current generated when the electronic device 10 is powered on. The one way switch 202 is connected to the resistance element 201 in series, and prevents current from flowing from the working circuit 30 to the power supply 40. In this embodiment, the resistance element 201 is connected between the power supply 40 and the one way switch 202. In alternative embodiments, the resistance element 201 can be connected between the one way switch 202 and the working circuit 30. As shown in FIG. 2, the resistance element 201 includes a first resistor R1 and a second resistor R2 connected in parallel, each having 50 ohms of resistance. The one way switch 202 is a diode D1 with an anode connected toward the power supply 40 and a cathode connected toward the working circuit 30. Voltage drop of the diode D1 is about 0.7V. Connection of the resistance element 201 to the one way switch 202 can prevent current from flowing from the working circuit 30 to the power supply 40 and the resistance element 201, thereby decreasing power loss. It may be understood that the above structures of the resistance element 201 and the one way switch 202 are exemplary and may be varied.

The second power supply circuit 210 is also connected between the power supply 40 and the working circuit 30, and forwards power from the power supply 40 to the working circuit 30 when the power supply 30 reaches a predetermined voltage. The second power supply circuit 210 includes a switch element 212 and a voltage regulation element 211. The voltage regulation element 211 is connected to the power supply 40, and regulates the power supply 40 when the power supply 40 reaches the predetermined voltage. The switch element 212 includes a control port 2120, an input port 2121, and an output port 2122. The control port 2120 is connected to the power supply 40 and the voltage regulation element 211, the input port 2121 is connected to the power supply 40, and the output port 2122 is connected to the working circuit 30. Voltage drop of the one way switch 202 is higher than that of the switch element 212. When the power supply 40 reaches the predetermined voltage, the voltage regulation element 211 regulates the power supply 40, and controls the switch element 212 to turn on. Because the voltage drop of the switch element 212 is lower than that of the one way switch 202, the one way switch 202 is turned off, and the second power supply circuit 210 forwards power to the working circuit 30. In one embodiment, the predetermined voltage is set according to a regulated voltage of the voltage regulation element 211.

As shown in FIG. 2, the voltage regulation element 211 is a zener diode D2 with an anode grounded and a cathode connected to the power supply 40, which has a regulated voltage of 6V. The switch element 210 is a P channel metal oxide semiconductor field effect transistor (PMOSFET) Q1, the control port 2120 is a gate of the PMOSFET Q1, the input port 2121 is a source of the PMOSFET Q1, the output port 2122 is a drain of the PMOSFET Q1, and the gate of the PMOSFET Q1 is connected to the cathode of the zener diode D2. The voltage drop of the PMOSFET Q1 is about 0.3V. It may be understood that the voltage regulation element 211 and the switch element 212 may include other elements implementing the same function.

The second power supply circuit 210 further includes a third resistor R3 connected between the power supply 40 and a node between the cathode of the zener diode D2 and the gate of the PMOSFET Q1 to limit current. Resistance of the third resistor R3 is about 300 ohms, in one example. In one embodiment, the predetermined voltage is determined by the regulated voltage of the voltage regulation element 211 and the resistance of the third resistor R3. The electronic device 10 further includes a bypass capacitor C1 connected to the power supply 40. In one embodiment, the power supply 40 may be a direct current power supply.

During the first moments when the electronic device 10 has just been powered on by the power supply 40, voltage of the power supply 40 has not reached 6V to make the zener diode D2 to regulate voltage. Thus, voltage at the gate and the source of the PMOSFET Q is same, the PMOSFET Q1 is turned off, and the second power supply circuit 210 does not work. At this time, the diode D1 of the first power supply circuit 200 is turned on to forward power from the power supply 40 to the working circuit 30. Inrush current is obviously decreased due to current limiting of the first resistor R1 and the second resistor R2, for example, from 37.1 A without the inrush current suppressing circuit 20 to 4.81 A as determined by testing.

During power up of the electronic device 10, when the voltage of the power supply 40 reaches about 8V, the zener diode D2 is triggered to hold the voltage at the gate of the PMOSFET Q1 to 6V, lower than the voltage at the source of the PMOSFET Q1 of 8V. Thus, the PMOSFET Q1 is turned on. Because the voltage drop of the PMOSFET Q1 is 0.3V, lower than the voltage drop of the diode D1 of 0.7V, the diode D1 is turned off, and the second power supply circuit 210 forwards power from the power supply 40 to the working circuit 30. Because there are no elements with high voltage loss in the second power supply circuit 210, the second power supply 210 forwards power with high voltage to the working circuit 30.

The electronic device 10 and the inrush current suppressing circuit 20 can suppress inrush current effectively, and are not easily influenced by ambient temperature, resulting in stable performance. In addition, according to the voltage drop of the two power supply circuits 200 and 210, automatic switching between the two power supply circuits 200 and 210 is achieved, when the voltage of the power supply 40 changes, to raise input voltage of the working circuit 30.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. An inrush current suppressing circuit, connected between a power supply and a working circuit of an electronic device, the inrush current suppressing circuit comprising:
    a first power supply circuit, connected between the power supply and the working circuit, operable to forward power from the power supply to the working circuit when the electronic device is powered on, the first power supply circuit comprising:
        a resistance element, operable to suppress the inrush current; and
        an one way switch, connected to the resistance element in series, operable to prevent current from flowing from the working circuit to the power supply; and
    a second power supply circuit, connected between the power supply and the working circuit, operable to forward power from the power supply to the working circuit when the power supply reaches a predetermined voltage, the second power supply circuit comprising:
        a switch element, comprising a control port, an input port, and an output port, wherein the control port and the input port are both electrically connected to the power supply, and the output port is connected to the working circuit; and
        a voltage regulation element, connected to the power supply and the control port of the switch element, to regulate the power supply when the power supply reaches the predetermined voltage and to control the switch element to turn on;
    wherein voltage drop of the one way switch is higher than that of the switch element.

2. The inrush current suppressing circuit of claim 1, wherein the resistance element comprises a first resistor and a second resistor connected to the first resistor in parallel.

3. The inrush current suppressing circuit of claim 1, wherein the one way switch is a diode with an anode connected toward the power supply and a cathode connected toward the working circuit.

4. The inrush current suppressing circuit of claim 1, wherein the voltage regulation element comprises a zener diode with an anode grounded and a cathode connected to the control port of the switch element.

5. The inrush current suppressing circuit of claim 4, wherein the switch element is a P channel metal oxide semiconductor field effect transistor (PMOSFET), the control port is a gate of the PMOSFET, the input port is a source of the PMOSFET, and the output port is a drain of the PMOSFET.

6. The inrush current suppressing circuit of claim 1, further comprising a third resistor connected between the power supply and a common end between the voltage regulation element and the control port of the switch element.

7. An electronic device, powered by a power supply, comprising:
    a working circuit; and
    an inrush current suppressing circuit, connected between the power supply and the working circuit, operable to forward power from the power supply to the working circuit and to suppress inrush current generated when the electronic device is powered on, the inrush current suppressing circuit comprising:
        a first power supply circuit, connected between the power supply and the working circuit, operable to forward power from the power supply to the working circuit when the electronic device is powered on, the first power supply circuit comprising:
            a resistance element, operable to suppress the inrush current; and
            an one way switch, connected to the resistance element in series, to prevent current from flowing from the working circuit to the power supply; and
        a second power supply circuit, connected between the power supply and the working circuit, operable to forward power from the power supply to the working circuit when the power supply reaches a predetermined voltage, the second power supply circuit comprising:
            a switch element, comprising a control port, an input port, and an output port, wherein the control port and the input port are both electronically connected to the power supply, and the output port is connected to the working circuit; and
            a voltage regulation element, connected to the power supply and the control port of the switch element, operable to regulate the power supply when the power supply reaches the predetermined voltage and to control the switch element to turn on;
        wherein voltage drop of the one way switch is higher than that of the switch element.

8. The electronic device of claim 7, wherein the resistance element comprises a first resistor and a second resistor connected to the first resistor in parallel.

9. The electronic device of claim 7, wherein the one way switch is a diode with an anode connected toward the resistance element and a cathode connected toward the working circuit.

10. The electronic device of claim 7, wherein the voltage regulation element is a zener diode with an anode grounded and a cathode connected to the control port of the switch element.

11. The electronic device of claim 10, wherein the switch element is a P channel metal oxide semiconductor field effect transistor (PMOSFET), the control port is a gate of the PMOSFET, the input port is a source of the PMOSFET, and the output port is a drain of the PMOSFET.

12. The electronic device of claim 7, further comprising a third resistor connected between the power supply and a common end between the voltage regulation element and the control port of the switch element.

* * * * *